June 28, 1927.
C. C. FARMER
1,633,728
FEED VALVE DEVICE
Filed Nov. 29, 1924
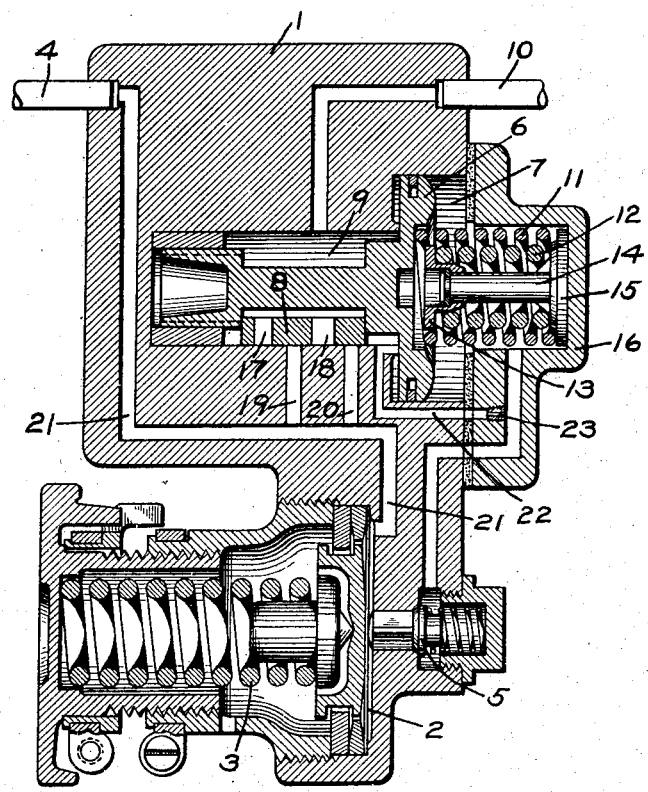
INVENTOR
CLYDE C. FARMER
BY Wm. M. Cady
ATTORNEY Patented June 28, 1927.

1,633,728

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FEED-VALVE DEVICE.

Application filed November 29, 1924. Serial No. 752,973.

This invention relates to feed or reducing valve devices for maintaining the fluid pressure in a system at a predetermined degree, and more particularly as employed in a fluid pressure brake system for maintaining the fluid pressure in the brake pipe.

The principal object of my invention is to provide an improved feed valve device adapted to prevent overcharging of the brake pipe or other receptacle, the pressure in which is to be maintained.

In the accompanying drawing, the single figure is a sectional diagrammatic view of a feed valve device embodying my invention.

As shown in the drawing, the feed valve device may comprise a casing 1 containing a regulating portion and a fluid under pressure supply portion. The regulating portion may comprise the usual diaphragm 2, subject on one side to the pressure of an adjustable regulating spring 3 and on the opposite side to the pressure of fluid in the brake pipe 4 or other receptacle, the pressure in which is to be regulated. The diaphragm 2 is adapted to operate a valve 5 for venting fluid under pressure from the supply portion.

The fluid supply portion may comprise a piston 6 contained in piston chamber 7 and a slide valve 8, contained in valve chamber 9, and adapted to be operated by piston 6. The valve chamber 9 is connected to a supply pipe 10 which leads to a source of fluid under pressure, such as the main reservoir (not shown).

A coil spring 11 engages the piston 6 and an additional coil spring 12, disposed within the spring 11 is provided. The inner end of the spring 12 engages a member 13 which is slidably mounted on a stem 14 having a base member 15 which engages the inner walls of the cap section 16.

The slide valve 8 is provided with two ports 17 and 18 adapted to register respectively with passages 19 and 20 leading to the brake pipe passage 21, said ports being so disposed, that port 18 will commence to register with passage 20 before the port 17 registers with passage 19. The member 13 is so positioned that the same will be engaged by the piston 6, when the piston has moved the slide valve 8 to the position in which only the port 18 partly registers with passage 20.

In operation, assuming that the brake pipe 4 is fully charged to the pressure for which the spring 3 is adjusted, the fluid pressure from the brake pipe 4, acting on the diaphragm 2, moves the diaphragm so that valve 5 is allowed to seat, permitting the fluid pressure on opposite sides of the piston 6 to equalize by way of passage 22 and restricted port 23.

If a slight drop in brake pipe pressure occurs, the fluid pressure on diaphragm 2 is correspondingly reduced and the diaphragm is then moved by the spring 3, so as to open the valve 5. Fluid under pressure is thereupon vented from piston chamber 7 to the brake pipe 4 and piston 6 is moved outwardly until the piston engages the member 13. In this position, the port 18 partly registers with passage 20, while the port 17 has not yet been brought into registry with passage 19, so that fluid is supplied from valve chamber 9 and the source of fluid under pressure to the brake pipe. The port 18 being only partly in registry with passage 20, the flow of fluid is gradual and thus an overcharge of the brake pipe is prevented.

Should the brake pipe leakage be greater than can be supplied through the restricted communication above described, the reduced brake pipe pressure will be such that the fluid pressure in valve chamber 9 will shift the piston 6 outwardly, compressing the spring 11.

In this outer position, both ports 17 and 18 register with the respective passages 19 and 20, so as to provide a large port opening area for quickly charging the brake pipe.

Having now described my invention, what I claim as new and desire to secure by Letters Patent, is:—

1. In a feed valve device, the combination with a regulating portion for supplying fluid under pressure to an outlet and of a fluid supply portion comprising a piston controlled by said regulating portion, a valve operated by said piston and having a position in which a restricted communication for supplying fluid under pressure to said outlet is opened, a spring for defining said position, and an additional spring for opposing movement of said piston.

2. A feed or reducing valve device including a fluid supply portion for supplying fluid under pressure to an outlet and comprising a piston, a valve operated by said piston and having a position providing a restricted communication through which fluid under pressure is supplied to said outlet, a spring for yieldingly limiting the movement of said piston beyond said position, and an additional spring acting on said piston.

3. A feed or reducing valve device including a fluid supply portion for controlling the supply of fluid under pressure to an outlet and comprising a piston, a valve operated by said piston and having one position providing a restricted communication through which fluid under pressure is supplied to said outlet and a position providing a large opening for supplying fluid under pressure to said outlet, a spring for opposing movement of said piston to the first mentioned position, and an additional spring for opposing the further movement of said piston.

4. A feed or reducing valve device including a fluid supply portion for controlling the supply of fluid under pressure to an outlet and comprising a piston, a valve operated by said piston and having a position providing a restricted communication through which fluid under pressure is supplied to said outlet and a position providing a large opening for supplying fluid under pressure to an outlet and a spring constantly opposing movement of said piston and valve, and an additional spring for opposing movement of said piston beyond the first mentioned position.

5. A feed or reducing valve device including a fluid supply portion including a piston, a slide valve operated by said piston and having two ports, one adapted to partly register with an outlet passage in a position assumed upon a partial movement of the piston and slide valve and the other adapted to register with an outlet passage upon a further movement of said piston, a spring for opposing movement of said piston, and an additional spring for opposing movement of said piston beyond said position.

In testimony whereof I have hereunto set my hand.

CLYDE C. FARMER.